Dec. 2, 1952   J. G. MOOHL   2,619,851
GRINDING MACHINE
Filed April 1, 1948   6 Sheets-Sheet 4

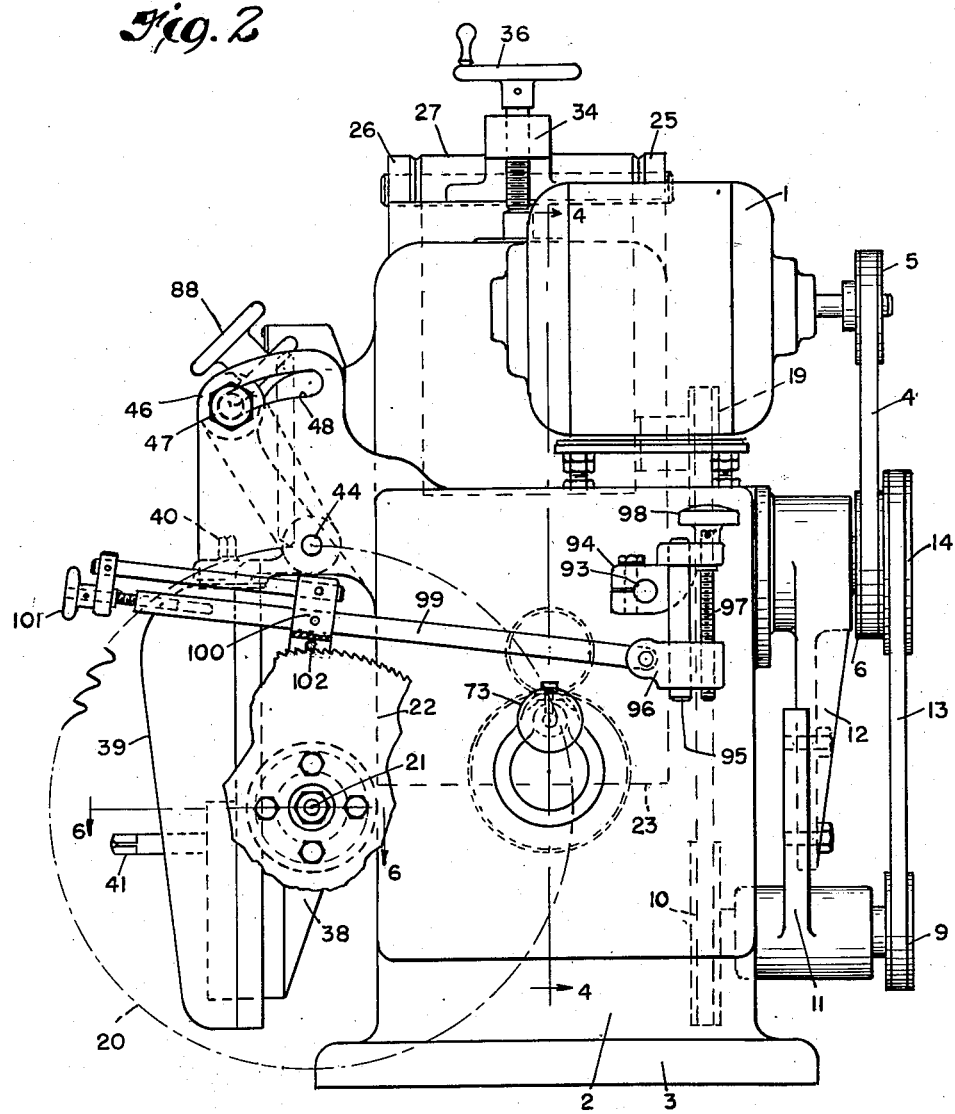

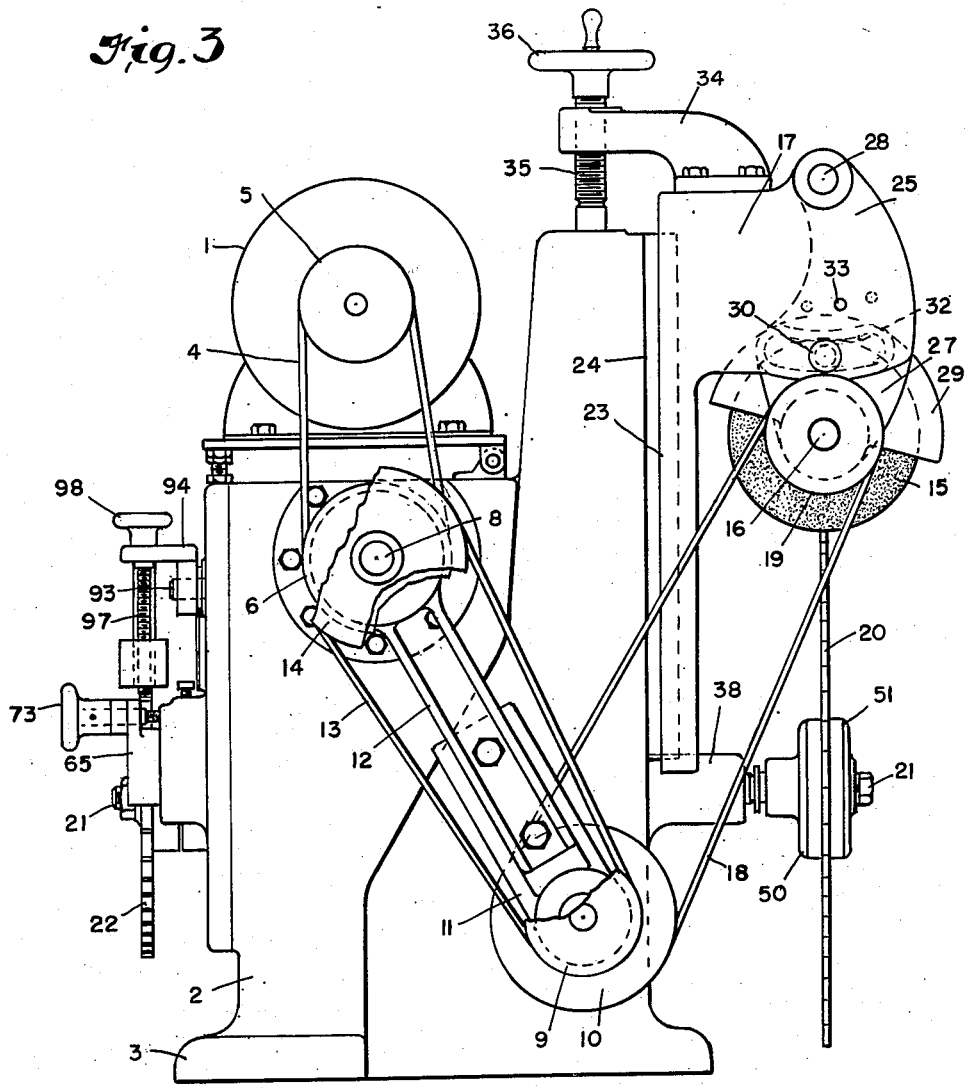

INVENTOR
JOHAN GUSTAF MOOHL
BY Oberlin & Limbach
ATTORNEYS.

Dec. 2, 1952 J. G. MOOHL 2,619,851
GRINDING MACHINE
Filed April 1, 1948 6 Sheets-Sheet 5

INVENTOR
JOHAN GUSTAF MOOHL
BY Oberlin & Limbach
ATTORNEYS.

Dec. 2, 1952 J. G. MOOHL 2,619,851
GRINDING MACHINE
Filed April 1, 1948 6 Sheets-Sheet 6
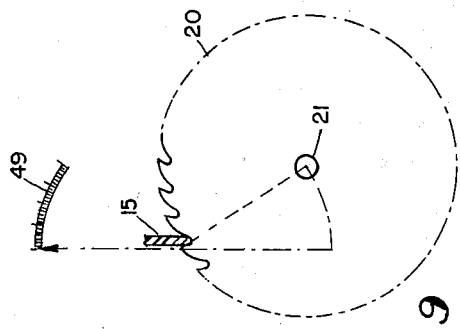
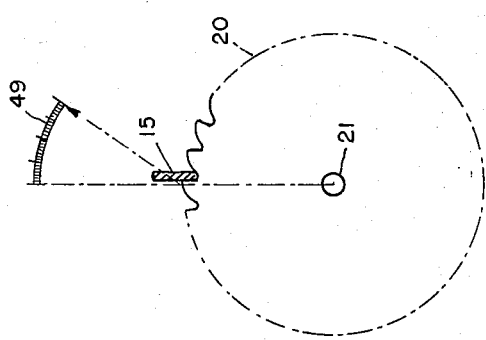
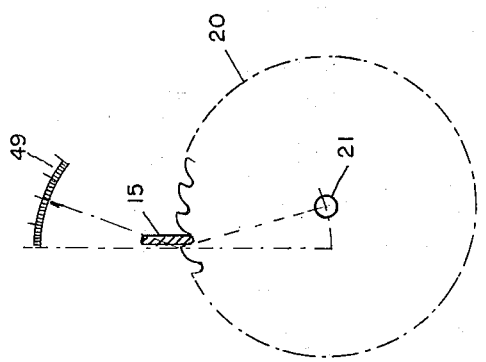
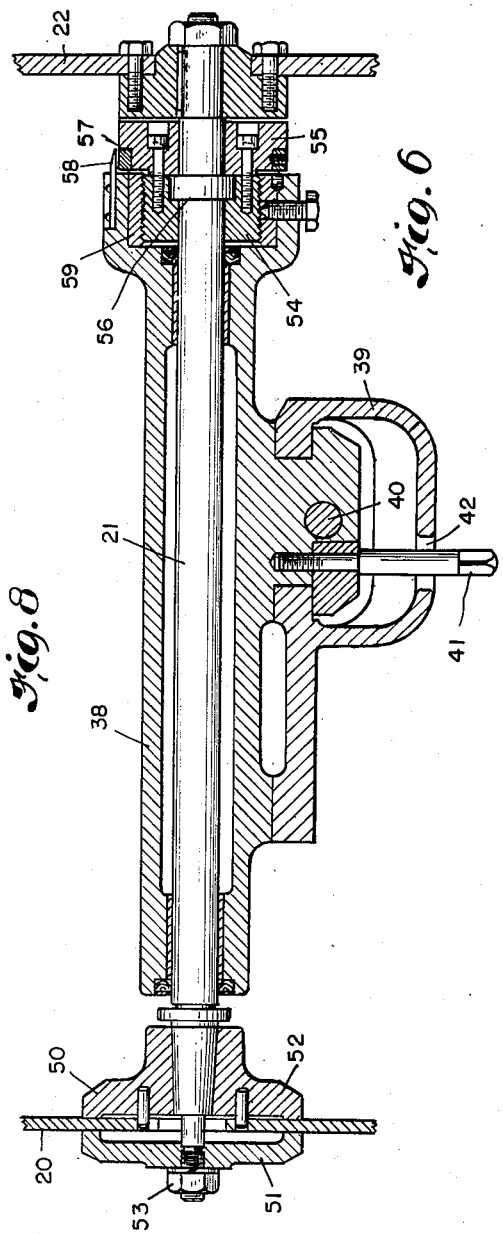
INVENTOR
JOHAN GUSTAF MOOHL
BY Oberlin & Limbach
ATTORNEYS Patented Dec. 2, 1952

2,619,851

UNITED STATES PATENT OFFICE 2,619,851

GRINDING MACHINE

Johan Gustaf Moohl, Cleveland Heights, Ohio, assignor to The Motch & Merryweather Machinery Company, Cleveland, Ohio, a corporation of Ohio Application April 1, 1948, Serial No. 18,332

19 Claims. (Cl. 76—41)

This invention relates as indicated to grinding machines and, more particularly, to automatic saw grinding machines designed to grind and sharpen the teeth of a circular saw disk to desired contour.

Automatic saw grinding machines of the general type to which the present invention is directed are well known in the art. A particularly efficient form of prior art machine is one in which the saw blade or disk to be sharpened is secured to an arbor on which is also mounted an index plate or ratchet having teeth equal in number to the teeth of the saw blade. A pawl mechanism operates to rotate such index plate and saw blade in timed relation to in-and-out movement of a grinding wheel of desired contour. The grinding wheel is carried by a head which is thus reciprocated by means of cams to produce the correct tooth shape.

For each type of sawing operation there is one tooth form which is most efficient in its cutting action. As a result, it is very important that any saw grinding machine be adapted to produce a wide variety of saw tooth contours, and in the past it has generally been necessary whenever a change in tooth contour has been desired either to replace the cams, whereby the grinding head is reciprocated, or to make other adjustments of a rather complicated nature. It is often desirable, particularly in the case of metal cutting saws, to produce a saw blade having alternate high and low teeth and the difference in height of such teeth will frequently vary depending upon the diameter of the saw blade and the cutting operation which is to be performed thereby. It is therefore a primary object of my invention to provide an automatic saw grinding machine which is quickly adjustable to produce a wide variety of tooth contours including differences in the relative elevation of such teeth.

Another common variable in the tooth form is the degree of rake which such teeth should have. In the past it has been necessary, when the desired rake angle has been determined, first to compute the distance which the saw blade must be shifted laterally depending upon the diameter of such blade, and then to move the blade toward the grinding wheel into position for the grinding operation. While the mathematical computations involved are not very complicated, nevertheless there has always been room for error on the part of the operator and such errors are not infrequent in practice. It is therefore another object of my invention to provide saw blade mounting means whereby the operator may position the saw blade to obtain the desired rake angle without the necessity of making any computation whatsoever.

It is generally important that the crown of the saw tooth be perfectly straight and flat across transversely of the saw blade, and this of course necessitates centering the plane of such blade radially of the grinding wheel. Errors on the part of the operator in making this adjustment frequently tend to produce non-uniform or slightly lopsided tooth shapes. It is therefore a further object of my invention to provide means for axially adjusting the saw blade supporting arbor adapted positively to center the saw blade on the grinding wheel.

Other objects and advantages will become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the said annexed drawings:

Fig. 2 is a side elevational view of the index plate side of such machine;

Fig. 3 is a side elevational view taken at right angles to Fig. 1 and showing the belt drive means;

Fig. 6 is a longitudinal sectional view of the saw blade arbor supporting means taken along the line 6—6 on Fig. 2;

Figs. 7, 8 and 9 are diagrammatic views illustrating the manner in which adjustment to the desired rake angle is made.

Figure 1:
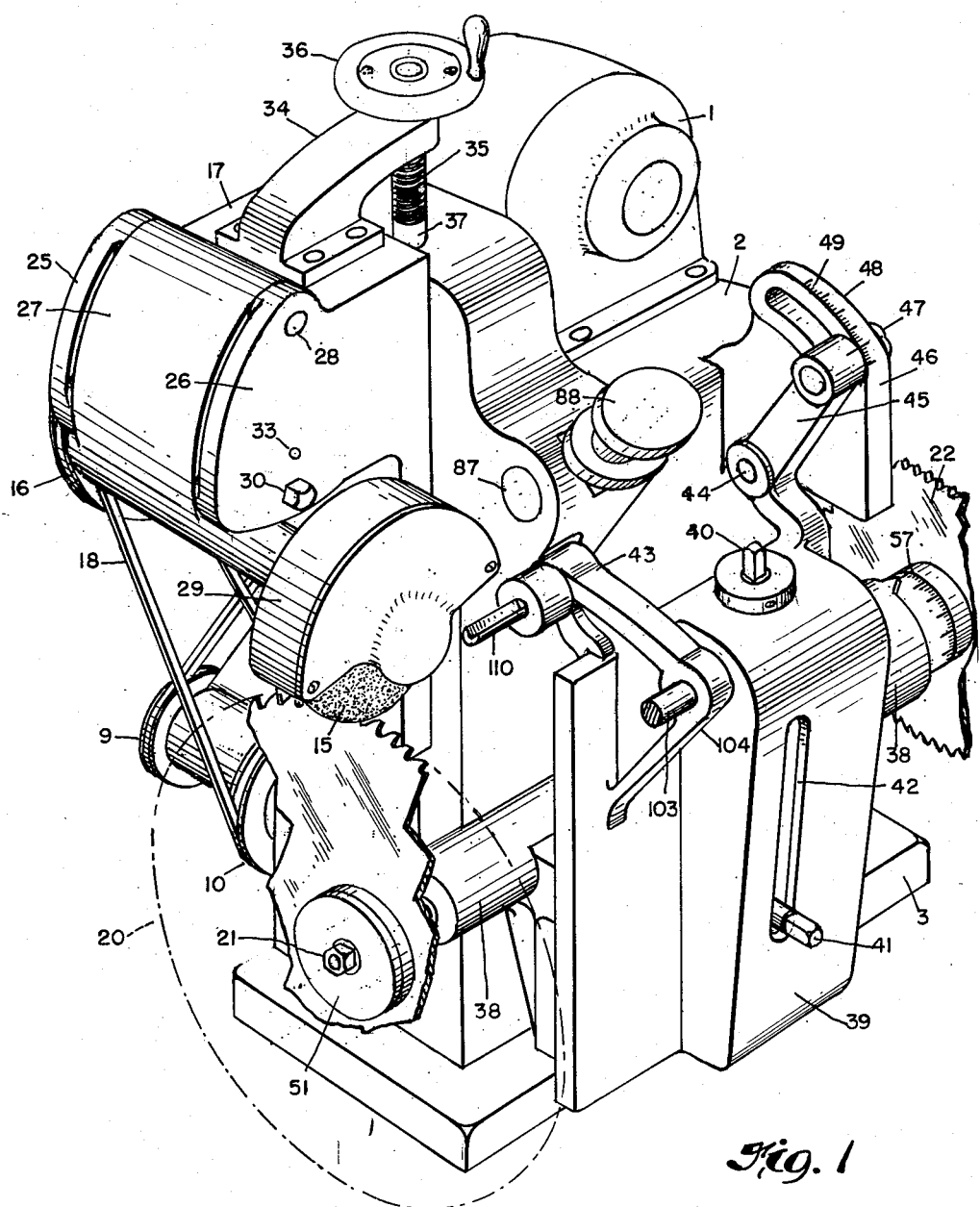
Fig. 1 is a perspective view, slightly from above, of a form of saw grinding machine constructed in accordance with my invention.

Referring now more particularly to such drawings and especially Figs. 1–3 inclusive, the general construction of the grinding machine of this invention will first be described. An electric motor 1 is mounted upon a housing 2 carried by a base 3. The whole is adapted to be supported upon a bench or pedestal as desired. A V-belt 4 passes about pulley 5 of such motor and pulley 6 keyed to shaft 8 driving the latter. A pair of pulleys 9 and 10 are mounted on an adjustable slide 11 carried by bracket 12 pivotally supported on shaft 8. A V-belt 13 connects pulley 9 and pulley 14, such latter pulley being keyed to shaft 8, thereby driving such former pulley and pulley 10. Grinding wheel 15 is secured to shaft 16 which in turn is supported in the vertically reciprocable head 17. V-belt 18 connects pulley 10 and pulley 19 keyed to shaft 16 to drive the grinding wheel. The sliding mount 11 for pulleys 9 and 10 will be adjusted to provide the proper degree of tension in the belt drive.

The saw blade 20 is mounted on one end of arbor 21 and index plate or ratchet 22 is mounted on the other end. The means for driving such index plate will be described more in detail below. For the present, it need merely be explained that the saw blade is slowly rotated in timed relation to the vertical reciprocation of the grinding head 17 to generate the desired tooth contour. Ordinarily, the saw teeth will already have been roughed out and the grinder will be employed for a finishing operation only. It is entirely practicable, however, to generate the teeth from a plain circular disk if it is desired to do so.

The grinding head

The grinding head generally designated 17 above consists of a slide portion 23 engaged with vertical slideway 24 and having two upper forwardly extending wing portions 25 and 26. A frame member 27 is pivotally suspended at 28 between such wing portions with grinding wheel arbor 16 journalled therein. The hood or shield 29 for the grinding wheel is likewise carried thereby. A bolt 30 fitted in holes in wing portions 25 and 26 passes through arcuate slots 31 and 32 in pivotally suspended frame member 27 and may be tightened to clamp such frame member in desired pivotal position between such wings. Holes 33 in wing portions 25 and 26 of head 17 are additionally provided into which a pin may be inserted to engage a corresponding hole in frame member 27 so located as to be in alignment therewith when the grinding wheel arbor 16 is in vertically centered position. This is of considerable convenience since a large proportion of the grinding operations will ordinarily be performed with the wheel in this position. Similar additional holes may be provided to either side of hole 33 for ready positioning of the grinding wheel at a pre-selected angle.

The entire grinding head is supported by a bracket 34 secured to the top thereof and threadedly engaging a vertical screw 35. A handwheel 36 is mounted on the upper end of such screw and the lower end rests upon a vertically reciprocable member 37 extending upwardly from the housing. Such member 37 is adapted to be reciprocated by cam mechanism described below, thereby to vertically reciprocate grinding wheel 15 to generate the tooth form. By turning handwheel 36 the operator may gradually lower the entire grinding head relative to member 37 to increase the depth of cut.

The saw arbor

Reference may now be had additionally to Figs. 6-9 of the drawing which illustrate the mounting of the saw arbor 21 and the manner in which its position may be adjusted both axially and laterally. This arbor is adapted to support various diameters of saw blades 20 at one end and to be rotated through index plate 22 at the other end.

The mounting for such arbor is adjustable to provide for the grinding of such saw disks of various diameters and also to obtain any desired positive or negative rake of the saw teeth. In order to obtain such rate without calling upon the operator to make any mathematical computations or difficult adjustments, a dial or scale is provided upon which the rake angle may be read directly. When the support for the saw arbor has been secured in selected position as indicated on such dial, the saw supporting arbor is then simply moved along the pointer arm until the saw blade encounters the grinding wheel.

Referring now particularly to Figs. 1, 2, and 6, arbor 21 is journalled in a bracket 38 which is slidably supported within frame 39. The position of such bracket within frame 39 may be regulated by turning vertical adjusting screw 40 and such bracket then clamped securely in the selected position by means of screw 41 which protrudes through slot 42 in frame 39. Such frame is hinged at 43 and 44 to the housing 2 and an arm 45 integral with such frame extends upwardly alongside bracket 46. A bolt 47 passing through the end of such arm and slot 48 in bracket 46 serves to lock such arm and therefore frame 39 at the angle desired. A calibrated scale 49 alongside such slot permits arm 45 to be set to provide precisely the rake angle to be produced. Screw 40 is then turned to slide bracket 8 and therefore the saw arbor 21 toward the grinding wheel 15. As indicated above, this is in fact equivalent to moving the saw arbor along the pointer arm of a dial after setting such arm to the position desired. Fig. 8 of the drawing shows a setting of arm 45 (corresponding to the arrow) resulting in no rake of the saw teeth while Figs. 7 and 9 illustrate the manner in which a progressively increasing degree of rake may be obtained. As above indicated, the position of such arm and slot may also be arranged to provide a negative rake angle if such be required.

The saw blade 20 is secured to the end of arbor 21 by means of cooperating clamping members 50 and 51. Pins such as 52 prevent rotation of the saw blade relative to member 50 and such latter member is secured to arbor 21 for rotation therewith. Clamping member 51 is held in place by means of nut 53. It will thus be apparent that, whatever the thickness of the saw blade being sharpened, its inner or right-hand side as viewed in Fig. 6 will always lie in exactly the same plane. As will be explained below, this facilitates axial adjustment of the arbor to obtain proper centering of the saw blade diametrically of the grinding wheel to ensure that the crowns of the saw teeth are ground flat across.

The saw arbor is journalled in its supporting bracket 38 to permit a limited amount of axial adjustment relative thereto. A sleeve comprising two annular members 54 and 55 secured together as a unit engages a circumferential boss 56 on the arbor and is threaded into the index plate end of arbor supporting bracket 38. By rotating such sleeve the arbor may thus be axially reciprocated as desired. A calibrated scale 57 is provided on such sleeve reading in thousands of an inch and a pointer 58 is mounted on the end of support 38. When the sleeve is turned so that such pointer indicates a zero reading, the saw blade engaging face of clamping member 50 will be in perpendicular alignment with the axis of grinding wheel arbor 16, and therefore such face and the inner side of the saw blade supported therealong will be disposed diametrically of the grinding wheel.

To adjust the saw arbor to provide for grinding the saw teeth squarely across, the operator first calipers the width of the saw tooth and then turns scale 57 to the exact reading he obtained. The pitch of the threads 59, however, is exactly half that required to give the indicated reading on scale 57. This means that the saw blade will have been shifted inwardly (to the right as viewed in Fig. 6) exactly one half the thickness of the saw tooth; or, in other words, the grinding wheel will have been exactly centered on the width of the saw as desired to obtain an even cut. Not only does this arrangement have the advantage of avoiding the necessity for the operator to make any mathematical computation, but also the dial scale may be twice the size it would otherwise be, permitting more accurate adjustment. Since all adjustment is made in one direction only, still another source of error is eliminated.

The grinder reciprocating mechanism

Figures 4, 10:
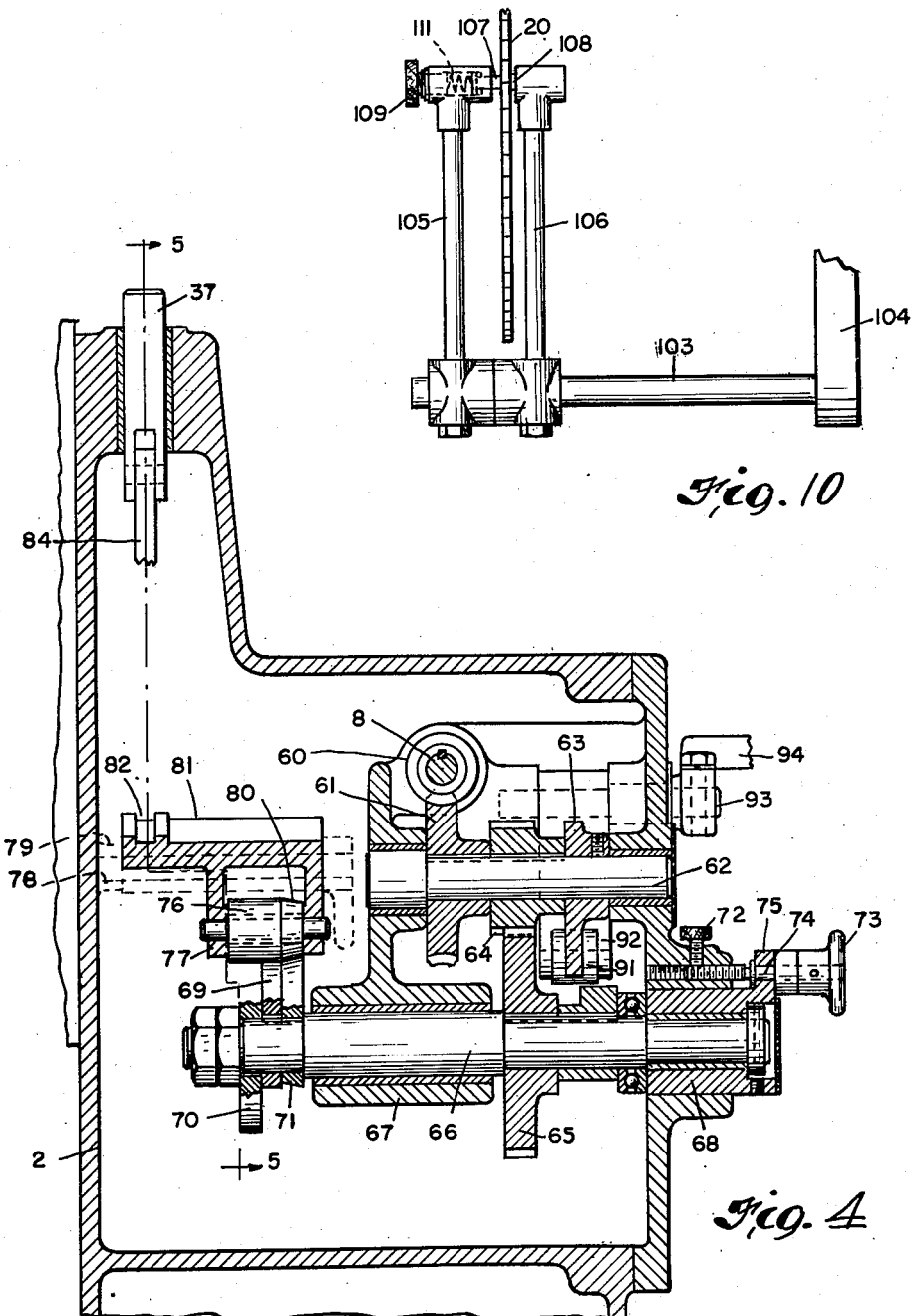
Fig. 4 is a vertical sectional view taken along the line 4—4 on Fig. 2 and showing the gearing and cam mechanism operative to reciprocate the grinding head and drive the index plate.
Fig. 10 is a top plan detail view of the brake or drag means which controls rotation of the saw blade.
Figure 5:
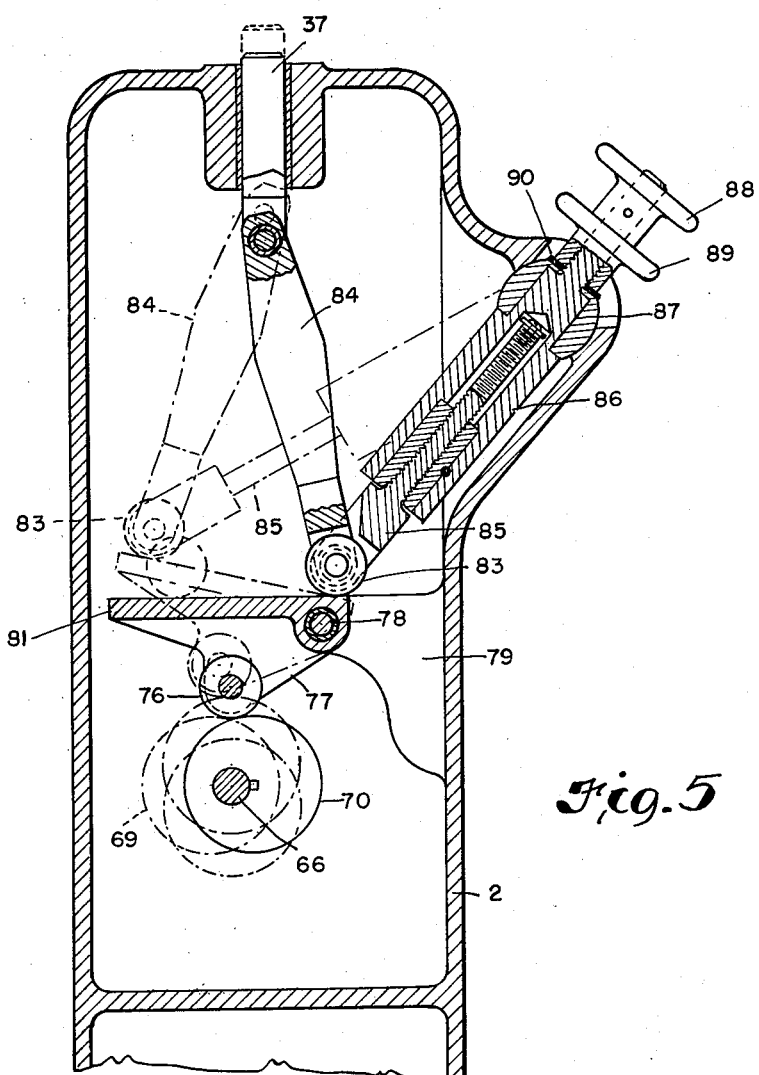
Fig. 5 is a vertical sectional view taken along the line 5—5 on Fig. 4 showing means for adjusting the degree of reciprocation of the grinding head.

Reference may now additionally be had to Figs. 4 and 5 of the drawings illustrating the manner in which reciprocation of the grinding head is obtained. As previously indicated, one important object of my invention is to provide adjusting means whereby operation of the machine may be shifted from the formation of alternately high and low teeth to the formation of all teeth of the same height. Similarly, means is also provided for selecting the exact depth of each cut. The adjusting mechanism is designed to be very simple to operate, although capable of producing a very wide variety of tooth contours.

As above explained, shaft 8 is driven from electric motor 1 through V-belt 4 and pulley 6. It carries a gear 60 keyed thereto which is in driving engagement with a worm gear 61 keyed to shaft 62. Shaft 62 carries a cam 63 secured thereto, the rotation of which serves to drive index plate 22 through means separately described below. Gear 64 also keyed to such shaft turns gear 65 and thereby shaft 66, the latter being journalled in fixed bracket 67 and a sliding journal 68. Gears 65 and 64 are in a 2 to 1 ratio so that shaft 66 will turn at only one half the speed of shaft 62. The reason for such ratio will become clear below.

A pair of identical cams 69 and 70 are keyed to the end of shaft 66, turned 180° apart. A third cam 71 of a different type is aligned with cam 69. Shaft 66 may be axially reciprocated within limits by releasing set screw 72 and turning hand-knob 73. Such hand-knob is secured to a shaft 74 passing through bracket 75 on main journal 68, shaft 74 terminating in a threaded portion engaged in the housing. A dial is provided on such knob and bracket 75 to indicate the extent of such reciprocation of shaft 66.

Axial movement of shaft 66 operates to adjust the position of cams 69, 70, and 71 relative to roller 76 carried by depending arm 77 of a bell crank pivoted at 78 on a bracket 79 projecting from the side wall of housing 2. Such roller 76 is tapered or beveled at one end 80 and cam 71 is formed with a complementary bevel. With shaft 66 in the position illustrated in Fig. 4 (cam 71 being shown engaging roller 76 at its greatest extent) cam 71 has no effect upon such roller and the bell crank arm 77 is rocked through the sole action of cams 69 and 70. Since cams 69 and 70 are identical, the bell crank will always be rocked to the same extent. This means that a uniform impulse will be transmitted through the subsequent train of elements to reciprocate the grinding head and all of the saw teeth will consequently be of the same height.

When, however, shaft 66 is shifted to the left as viewed in Fig. 4, cam 71 will be caused to ride up the bevel end 80 of roller 76 and cam 69 will no longer contact such roller. Consequently, cam 71 will rock bell crank arm 77 to a greater extent than cam 70 so that alternate teeth will be ground to different heights. The degree of difference will depend on the extent to which shaft 66 has been thus axially shifted as determined by the calibrated dial associated with knob 73. It will be appreciated, of course, that cams 69 and 70 may be formed as a single cam of general elliptical shape having two lobes which blend into each other for smooth action.

The train of elements connecting the bell crank with vertically reciprocable member 37 carrying the grinding head will now be described, including the means for varying the absolute depth of cut, particular reference being had to Fig. 5 of the drawing. The other arm 81 of the bell crank is formed with a guideway 82 in its upper surface along which roller 83 on the lower end of link 84 is adapted to travel. The upper end of such link is pivotally attached to the lower end of vertically reciprocable member 37. Another link 85 is also pivotally attached to roller 83 and is longitudinally extensible, being threadedly engaged in extension 86 which is supported in a horizontal swivel mount 87 journalled in an outward bulge of housing 2. Extension 86 may be rotated by means of hand-knob 88 to extend or draw in link 85 as required, hand-knob 89 threaded on extension 86 being backed off slightly from compression washer 90 to permit such rotation. It will be obvious from an inspection of Fig. 5 that when link 85 has been shortened as shown in solid line no reciprocation of member 37 will be obtained by the rocking of bell crank arm 81 and that a maximum reciprocation of such member 37 will be obtained when such link has been fully extended into the dot and dash line position.

At any selected position of roller 83, handwheel 26 may be adjusted to elevate the grinding head 17 sufficiently that the grinding wheel 15 will contact the saw blade only at the lowermost point of its reciprocation. The operator will then gradually turn such handwheel until the grinding wheel is contacting the saw blade at all points in its reciprocation at which time the grinding operation will be complete.

The indexing mechanism

Referring now particularly to Figs. 2 and 4 of the drawing, cam 63 turning with shaft 62 engages roller 91 on the end of bell crank arm 92 to rock stub shaft 93. A bracket 94 is clamped to the end of such latter shaft and carries a depending slide member 94 along which slide 96 is adapted to be adjustably positioned by means of screw 97 and hand-knob 98. A rod 99 is pivotally attached to such slide 96 and extends over index plate 22. A slide 100 is mounted on such rod and is adapted to be adjustably positioned therealong by means of hand-knob 101. A detent 102 carried by such slide 100 is adapted to engage the teeth of index plate 22 and to rotate such index plate as rod 99 is reciprocated through the rocking action of shaft 93 and bracket 94. The same diameter of index plate will generally be employed for all sizes of saw blades, but the number of teeth on the index plate will be made to correspond to the number of teeth on the saw blade. By adjusting knob 98 the stroke of rod 99 and detent 102 may be regulated, and by adjusting knob 101 the timing of the rotation of the index plate and thereby of the saw blade may be synchronized with the vertical reciprocation of the grinding head. The reason for the 2 to 1 ratio in the relative speeds of rotation of shafts 62 and 66 is now apparent since the two cams 69 (or 71) and 70 will cause the grinding head to be reciprocated twice for each rotation of shaft 66 while one rotation of shaft 62 and cam 63 will cause but a single reciprocation of rod 99.

To control rotation of the arbor and prevent over-running or the like, a conventional type of drag or brake means such as that shown in Fig. 10 may be employed. A bar 103 extends from bracket 104 on frame 39 and carries two arms 105 and 106 adjustably clamped thereon. These arms hold opposed steel shoes 107 and 108 respectively adapted to bear against opposite sides of the saw disc 20. Shoe 107 is backed by a compression spring 111, the pressure of which may be regulated by thumb screw 109. The amount of drag employed will be such as to make rotation of the arbor 21 responsive only to the indexing means without, however, making such drag excessive.

The inner face of the grinding wheel 15 lies in the same plane as the axis of the pivotal mounting 43, 44 of the saw arbor support. Accordingly, when setting up the machine, arm 45 will be locked in position to provide the desired rake angle and then the saw arbor supporting bracket 38 will be slid up frame 39 until the outer periphery of the saw disc is aligned with the axis 43, 44. To facilitate such alignment, a stud or bar 110 may be provided extending axially of hinge 43. A V-shaped 90° groove in the upper side of such bar has its apex exactly on the axis 43, 44. Thus by placing an elongated gauge of square cross-section in such groove with its end extending beyond the saw blade, the blade may be brought into exactly the right position for grinding, no matter what the rake angle. The proper longitudinal adjustment of the arbor will also be made on scale 57. When the indexing means has been adjusted as above explained, handwheel 36 is turned to gradually lower the grinding head and wheel 15 until the latter contacts the blade. The grinding wheel is slowly lowered either to a predetermined depth or until the operator notes visually that there is uniform sparking contact at all points.

It will be seen from the foregoing that I have provided a saw grinding machine capable of producing a great variety of saw tooth contours including teeth of different heights on the same saw blade, which machine is readily adjustable by a relatively unskilled operator without the substitution of different parts and without introducing the many usual opportunities for error. While my new grinding machine is primarily designed and adapted for the grinding of rotary saw blades, it will be obvious to those skilled in the art that such machine may also be employed to grind various formed cutters, such as milling cutters, toothed index plates, and other shapes by the employment of appropriate cams.

Other modes of applying the principle of the invention may be employed, change being made as regards the details described, provided the features stated in any of the following claims or the equivalent of such be employed.

I therefore particularly point out and distinctly claim as my invention:

1. In a grinding machine for grinding the teeth of rotary saws and the like, a vertically reciprocable support, a grinding wheel carried by said support for rotation about a horizontal axis, a saw blade supporting arbor disposed to present the edge of such blade transversely to the periphery of said wheel including means adapted firmly to clamp such blade thereon, means mounting said arbor for swinging movement about a spaced axis parallel thereto, a dial indicating the angle at which said arbor is thus positioned relative to such axis, means operative to hold said arbor in such selected position, adjustable slide means for movement of said arbor toward and away from such axis, screw means for adjusting said arbor axially to align the central plane of such saw blade radially of said wheel, and means operative to reciprocate said grinding wheel support and turn said arbor in timed relation.

2. In a grinding machine for grinding the teeth of rotary saws and the like, a reciprocable support, a grinding wheel carried by said support, a saw blade supporting arbor disposed to present the edge of such blade transversely to the periphery of said wheel, a support for said arbor pivotally mounted for swinging movement about an axis parallel to said arbor and lying in the same plane as a face of said grinding wheel, indicator means directly indicating the angle at which said arbor is thus positioned about such axis relative to the plane of said wheel, this being the rake angle desired, means operative to lock said arbor in such selected angular position, adjustable slide means for movement of said arbor toward and away from such axis to bring the outer peripheral edge of such blade into alignment with such axis, means adapted to lock said slide in adjusted position, means operative to reciprocate said grinding wheel support to bring said wheel into grinding engagement with such blade edge so aligned, and means adapted to turn said arbor and blade in timed relation to such reciprocation.

3. In a grinding machine, a grinding wheel, a disc supporting arbor disposed to present the edge of such disc transversely to the periphery of said wheel, a support for said arbor pivotally mounted for swinging movement about an axis parallel to said arbor and lying in the same plane as said wheel, indicator means on said support directly indicating the angle at which said arbor is thus positioned about such axis relative to the plane of said wheel, means adapted for movement of said arbor toward and away from such axis, and a V-shaped grooved support having the apex of such V exactly on such axis and adapted to support a complementary gauge extending therefrom beyond such disc with an edge portion of such gauge demarking a continuation of such axis, whereby said arbor may be positioned with the periphery of such disc aligned with such axis for engagement with said grinding wheel.

4. In a grinding machine for grinding the teeth of rotary saws and the like, a reciprocable support, a grinding wheel carried by said support, a saw blade supporting arbor disposed to present the edge of such blade transversely to the periphery of said wheel, a circumferential boss on said arbor, a sleeve engaging said boss for axial shifting of said arbor in either direction, supporting means threadedly engaging said sleeve whereby said sleeve and arbor may be axially shifted by rotation of said sleeve, and a scale indicating the degree of rotation of said sleeve relative to said support, the pitch of such thread affording axial movement of said arbor equal to one-half the reading on said scale.

5. In a grinding machine for grinding rotary saw blades and the like, a reciprocable support, a grinding wheel carried by said support, a saw blade supporting arbor disposed to present the edge of such blade transversely to the periphery of said wheel, threaded means adapted to shift said arbor axially upon rotation of said means, a scale indicating the degree of rotation of said threaded means, the pitch of the threads of said threaded means actually affording axial movement of such saw supporting arbor equal to one-half the indicated reading on said scale, and saw blade clamping means on said arbor arranged to position a saw blade held thereby with its inner face lying in a diametral plane of said grinding wheel when said scale is set at zero reading.

6. In a grinding machine for grinding the teeth of rotary saw blades and the like, a support, grinding means carried by said support, a saw blade support arranged and disposed to present the edge of such blade to said grinding means transversely of the plane of movement of the latter, threaded means engaging said saw blade supporting means for axial shifting of such saw blade upon rotation of said threaded means, and a scale indicating the degree of rotation of said threaded means, the pitch of the threads of said threaded means actually affording axial movement of such saw blade equal to one-half the indicated reading on said scale.

7. In a saw grinding machine for grinding the teeth of rotary disc saws and the like, a reciprocable grinding head, a grinding wheel carried by said head, and means for reciprocating said head comprising an axially shiftable cam shaft, two identical cams mounted thereon having lobes respectively oppositely directed, a third cam mounted on said shaft adjacent one of said first-named cams and shaped to conform to the contour of said first-named cam on the side disposed theretoward but bevelled to a larger contour on the side away from said first-named cam, a bell-crank, a roller on one arm of said bell-crank adapted to engage said cams and having an end with a complementary bevel toward said bevelled cam, the other arm of said bell-crank supporting said grinding head, means operative to drive said cam shaft to rock said bell-crank to reciprocate said grinding head, and means for shifting said cam shaft axially to cause said bevelled cam to engage said bevelled roller and cause said roller to ride thereon, whereby reciprocation of said grinding head will be alternately of a greater and lesser degree.

8. In a saw grinding machine for grinding the teeth of rotary disc saws and the like, a reciprocable grinding head, a grinding wheel carried by said head, and means for reciprocating said head comprising an axially shiftable cam shaft, cam means having a plurality of lobes mounted on said shaft, another cam lobe alongside one of said first-named lobes and of identical contour on the side disposed theretoward but bevelled to a larger contour on the side away from said first-named cam, a bell-crank, a roller on one arm of said bell-crank adapted to engage said cams and having an end with a complementary bevel toward said bevelled cam, a link, a roller on one end of said link adapted to ride on the other arm of said bell-crank, a reciprocable member pivotally connected to the other end of said link and adapted to support said grinding head, means operative to adjustably position the roller end of said link along such bell-crank arm, means operative to drive said cam shaft to rock said bell-crank to reciprocate said grinding head, and means for shifting said cam shaft axially to cause said bevelled roller to ride up on said bevelled cam, whereby the degree of reciprocation of said grinding head will be increased proportionately during this stage of rotation of said cam shaft.

9. In a grinding machine for grinding the teeth of rotary disc saws and the like, a reciprocable grinding head, a grinding wheel carried by said head, and means for reciprocating said head comprising a cam shaft, cam means having a plurality of lobes mounted on said shaft, another cam lobe alongside one of said first-named lobes and of identical contour on the side disposed theretoward but bevelled to a larger contour on the side away from said first-named cam lobe, a bell-crank, a roller on one arm of said bell-crank adapted to engage said cams and having an end portion provided with a complementary bevel toward said bevelled cam, the other arm of said bell-crank supporting said grinding head, means operative to drive said cam shaft to rock said bell-crank to reciprocate said grinding head, and means for shifting said cam shaft axially to cause said bevelled roller to ride up on said bevelled cam, whereby the degree of reciprocation of said grinding head will be increased proportionately during this stage of rotation of said cam shaft.

10. In a grinding machine having a reciprocable grinding head, means for reciprocating such head comprising an axially shiftable cam shaft, a bell-crank, a roller on one arm of said bell-crank adapted to engage the cams of said cam shaft, the other arm of said bell-crank supporting said grinding head and said roller being bevelled at one end, a cam lobe on said cam shaft having a bevel complementary to the bevel on said roller, means operative to drive said cam shaft to rock said bell-crank to reciprocate said grinding head, and means for shifting said cam shaft axially to cause said bevelled roller to ride up on said bevelled cam, whereby the degree of reciprocation of said grinding head will be increased proportionately.

11. In a grinding machine having a reciprocable grinding head, means for reciprocating such head comprising an axially shiftable cam shaft, a plurality of differently disposed cam lobes mounted on said shaft for rotation therewith, a bell-crank, a roller on one arm of said bell-crank adapted to engage the cams of said cam shaft, the other arm of said bell-crank supporting said grinding head and said roller being bevelled at one end, one of said cam lobes having a complementary bevel, means operative to drive said cam shaft to rock said bell-crank to reciprocate said grinding head, and means for shifting said cam shaft axially to cause said bevelled roller to ride up on said bevelled cam lobe to a desired degree, whereby the relative degree of successive reciprocations of such grinding head will be modified proportionately.

12. In a grinding machine having a reciprocable grinding head, means for reciprocating such head comprising an axially shiftable cam shaft, cams on said shaft, a lever, a roller carried by said lever adapted to engage said cams to rock said lever, said roller being bevelled at one and one of said cams being formed with a complementary bevel, means interconnecting said lever and grinding head, means operative to drive said cam shaft to rock said lever to reciprocate such grinding head, and means for shifting said cam shaft axially relative to said roller to cause said bevelled roller to ride up on said bevelled cam to the extent required to obtain the desired degree of reciprocation of such grinding head.

13. In a grinding machine having a reciprocable grinding head, means for reciprocating such head comprising a plurality of cams, a roller engaging said cams in succession as said cams turn, said roller being bevelled at one end and one of said cams being formed with a complementary bevel, means interconnecting said roller and such grinding head for reciprocation of the latter as said roller rises and falls, and means for shifting said bevelled cam axially relative to said roller to cause said bevelled roller to ride up on said bevelled cam to correspondingly modify the degree of reciprocation of such grinding head.

14. In a grinding machine having a reciprocable grinding head, means for reciprocating such head comprising a rotatable cam having an axially offset portion, a roller engaging said cam offset portion, said roller and cam being formed with complementary bevels, means interconnecting said roller and such grinding head for reciprocation of the latter as said roller rises and falls, and means for relatively axially shifting said cam offset portion and roller to cause said roller to ride up on said cam offset portion without modifying engagement of said roller and the remainder of said cam and thereby correspondingly vary the degree of reciprocation of such grinding head.

15. In a grinding machine, a grinding wheel mounted for reciprocation in its own plane, a disc supporting arbor disposed to present the outer peripheral edge of such disc transversely to the periphery of said wheel, a support for said arbor pivotally mounted for swinging movement about an axis parallel to said arbor, said axis lying in the same plane as a side face of said grinding wheel between said arbor and said wheel, mounting means adapted for movement of said arbor toward and away from such axis to bring such outer peripheral edge of such disc into transverse alignment with such axis, said grinding wheel being reciprocable into grinding engagement with such edge of such disc so aligned, and means adapted to secure such disc in such selected position during such reciprocation of said grinding wheel.

16. In a grinding machine, a grinding wheel, a disc supporting arbor disposed to present the outer peripheral edge of such disc transversely to the periphery of said wheel, and a support for said arbor pivotally mounted for swinging movement about an axis parallel to said arbor, said axis lying in the same plane as a side face of said grinding wheel and spaced from the axis of said arbor a distance equal to the radius of such disc, said grinding wheel and disc-supporting arbor being mounted for relative reciprocation effective to bring said wheel into grinding engagement with the outer periphery of such disc.

17. In a grinding machine, a grinding wheel, a disc supporting arbor disposed to present the outer peripheral edge of such disc transversely to the periphery of said wheel, a support for said arbor pivotally mounted for swinging movement about an axis parallel to said arbor, said axis lying in the same plane as a side face of said grinding wheel, and mounting means for said arbor on said support adapted for adjustment of said arbor toward and away from such axis of such pivotal mounting, such pivotal mounting including supporting means for a straight-edge aligned with such axis and extending transversely of such disc whereby said arbor may be adjusted to bring the outer peripheral edge of such disc into transverse alignment with such axis, said grinding wheel and disc-supporting arbor being mounted for relative reciprocation toward and away from each other in their respective planes effective to bring said wheel into grinding engagement with the outer periphery of such disc at such point of alignment with such axis.

18. In a grinding machine having a reciprocable grinding head, means for reciprocating such head comprising a rotatable cam having generally diametrically opposite axially offset portions, a cam roller engaging the outer peripheries of said first cam portions sequentially as the latter rotate, said roller and one of said cam portions being formed with complementary bevels, means interconnecting said roller and such grinding head for reciprocation of the latter as said roller rises and falls, and means adapted relatively axially to shift said bevelled cam portion and roller to cause said roller to ride upon said cam portion without modifying normal engagement of said roller and the other cam portion and thereby correspondingly to vary the extent of alternate reciprocations of such grinding head only.

19. In a grinding machine having a reciprocable grinding head, means for reciprocating such head comprising a plurality of rotatable radially angularly related cam lobes, cam follower means adapted sequentially to engage the respective outer peripheral surfaces of said lobes as the latter rotate, means interconnecting said roller and such grinding head for reciprocation of the latter in response to reciprocation of said follower by said lobes, said follower and one of said lobes having complementary bevels, and means adapted relatively axially to shift such bevelled follower portion and said bevelled lobe to vary the degree of reciprocation of said follower and grinding head by said bevelled lobe without modifying such reciprocation by said other lobes.

JOHAN GUSTAF MOOHL.

REFERENCES CITED

The following references are of record in the file of this patent:

UNITED STATES PATENTS

| Number | Name | Date |
|---|---|---|
| 112,838 | Otis | Mar. 21, 1871 |
| 136,110 | Tucker | Feb. 18, 1873 |
| 143,447 | Grimes | Oct. 7, 1873 |
| 297,566 | Bush | Apr. 29, 1884 |
| 333,092 | Winkler | Dec. 22, 1885 |
| 338,693 | Balch | Mar. 30, 1886 |
| 760,566 | Rose | May 24, 1904 |
| 867,723 | Hedstrom | Oct. 8, 1907 |
| 1,135,245 | Zuleg | Apr. 13, 1915 |
| 1,277,375 | Butters | Sept. 3, 1918 |
| 1,401,693 | Hedstrom | Dec. 27, 1921 |
| 1,780,836 | Pribnow et al. | Nov. 4, 1930 |

FOREIGN PATENTS

| Number | Country | Date |
|---|---|---|
| 278,702 | Great Britain | July 26, 1928 |